Feb. 17, 1931.　　F. I. COSTA ET AL　　1,793,159
TANK FILLING DEVICE FOR AUTOMOBILES
Filed July 18, 1930
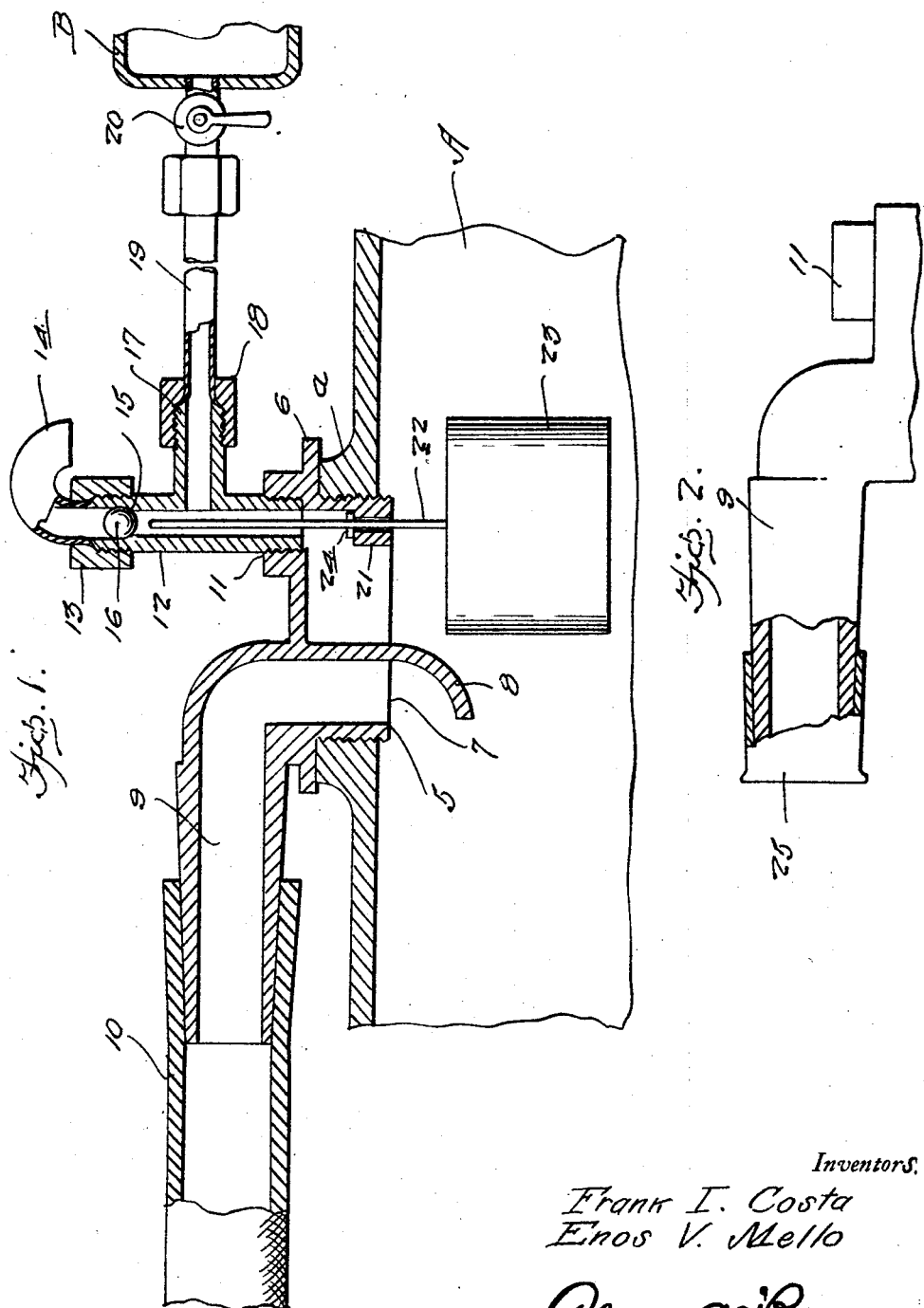
Inventors,
Frank I. Costa
Enos V. Mello
By Clarence A. O'Brien
Attorney Patented Feb. 17, 1931

1,793,159

UNITED STATES PATENT OFFICE

FRANK I. COSTA AND ENOS V. MELLO, OF LOS ALAMOS, CALIFORNIA

TANK-FILLING DEVICE FOR AUTOMOBILES

Application filed July 18, 1930. Serial No. 468,963.

This invention relates to new and useful improvements for liquid feeding devices and aims to provide means whereby the fuel tanks of automobiles, tractors, aeroplanes, may be quickly filled by the operation of the engine which provides suction for causing the flow of the fluid from a container into the tank. Obviously such a device will result in the saving of much time and labor and will overcome the necessity of using fuel cans, funnels and so forth.

Furthermore, the invention aims to provide a device that may be employed as the closure cap of the fuel tank so that it will not be necessary to remove the structure from the tank after the same has been charged with fuel.

In carrying out the present invention there is provided a device constructed for attachment to the fuel tank of an automobile, tractor, aeroplane, or like vehicle, and that has communication with the intake manifold of the gasolene engine of the automobile, tractor, aeroplane, or the like, further means being provided to permit a communication being established between the device and a source of fuel supply. When the device is in use a valve that is associated therewith for establishing communication between the tank and the engine intake manifold is opened so that the suction within the manifold will be employed to draw the fuel from the source of supply to the fuel tank. Furthermore, means is provided for automatically breaking the suction between the tank and intake manifold as soon as the tank has become substantially filled so that the fuel will not be sucked into the engine.

One of the most important objects of the invention is to provide a device that may be quickly associated with the fuel tank of an automobile, tractor, aeroplane or the like and this without requiring any alteration of the tank whatever. After the original installation the device may remain permanently associated with the tank so as to provide a closure for the fuel inlet opening thereof.

In the drawing:—

Figure 1 is a fragmentary section through the fuel tank of an automobile, aeroplane, tractor or other similar device with the intake opening of which is associated our improved device, communication being established between the device and the intake manifold of the engine by reason of a suitable pipe within which is arranged a cut-off valve, and Figure 2 is a side elevation, partially in cross section, of that portion of the device above the fuel tank, the hose attaching nozzle thereof being provided with a closure cap, while certain structural features are removed therefrom, the opening in the device for receiving said features being covered by a cap.

Now having particular reference to the drawing, A designates fragmentarily the fuel tank of an automobile, tractor, areoplane or similar device while B designates fragmentarily the intake manifold of the combustion engine of said automobile, tractor, aeroplane or the like. My invention per se consists of a circular cap 5 which in the present instance is disclosed as being externally threaded for threaded engagement within the usual threaded filler openings a of the tank A. Obviously, however, the cap may be of such construction as to permit of its threaded engagement upon externally threaded filler necks in the event the fuel tanks are equipped with such externally threaded filler necks. Therefore the particular tank A and the particular cap 5 is disclosed merely by way of illustration. Said cap 5 is provided adjacent its closed top with a flange 6 for engagement upon the usual ring surrounding the opening to limit the downward movement of the cap within said opening. Formed vertically through this cap 5 at the side wall thereof is a fuel intake opening 7 the inner wall of which is formed at its lower end with a curved extension 8 that engages beneath the lower end of the opening to deflect the fuel in the direction of the extension for a purpose hereinafter more fully described. The upper end of the fuel intake opening 7 merges into an outwardly extending horizontal nipple 9 over which is to be disposed one end of a fuel pipe 10 the opposite end of which is to have communication with the supply of fuel that is to be taken into the tank A.

The top wall of this cap 5 at a point opposed to the nipple 9 is formed with an internally threaded and collared opening 11 within which is threaded the lower end of a short vertical pipe 12 the upper end of which is also threaded and that has attached thereto through the medium of a suitable coupling at 13 a small gooseneck 14. Adjacent the upper end of this pipe 12 the interior thereof is so formed as to provide a ball valve seat 15 while loosely disposed within the upper end of the pipe is a ball valve 16 which may be readily removed by detaching the gooseneck 14.

Intermediate the ends of this pipe 12 the same is formed with a horizontal branch 17 to which is connected through the medium of a coupling 18 one end of a suction pipe 19, the opposite end of which is in communication with the intake manifold B by reason of a valved connection 20 which when opened will cause a suction through the pipe 19 during the operation of the engine.

The cap 5 is formed at a point directly beneath the pipe opening 11 with a vertical sleeve 21 through which is freely movable a stem 22 upon the lower end of which is a suitable float 23. The downward movement of this float is limited by the action of a cross pin 24 carried by the stem 22 resting upon the upper end of the guide sleeve 21. The length of the stem 21 is such that when the float 23 is in its pulled downward position the upper end of the stem will be disengaged from the ball valve 16 so that the same is free to rest upon its seat 15 and thus close the pipe 12 and consequently the tank A to the atmosphere.

It will therefore be obvious that in actual practice the suction within the manifold B will when the valve 20 is open create a suction within the tank A which will draw the fuel into the tank from the source of supply. As soon as the fuel within the tank reaches the float 23 the float will be caused to rise resulting in the stem 22 raising the ball 16 from its seat thereby breaking the vacuum and preventing further filling of the tank.

When the device is not being used for the purpose of filling the tank, the hose 10 is removed and a suitable cap 25 arranged upon the end of the nipple 9. The valve between the pipe 12 and the manifold B is turned off so that the engine may function without causing the suction through the line 19, pipe 12 and tank A.

In view of the foregoing description when considered in conjunction with the accompanying drawings, it will be apparent that we have provided a highly novel, simple and extremely efficient means whereby the fuel tanks of automobiles, tractors, aeroplanes and the like may be rapidly and efficiently filled and this without requiring the presence of a number of attendants.

Even though we have herein shown and described the invention as consisting of certain detailed structural elements, it is nevertheless to be understood that some changes may be made therein without affecting the spirit and scope of the appended claim.

We claim:

In means for facilitating the filling of fuel tanks, a body adapted to be disposed within the usual filler opening of the tank, a nipple projection from said body and having communication with the interior of the tank, a T-fitting secured to said body by one of its arms and having communication with the interior of the tank, suction means having communication with the interior of the fitting, a gravity seated valve within the fitting and adapted to be unseated by fuel level operative means within the tank and being normally adapted to maintain the fitting closed to the atmosphere, and a downwardly bent tube extending from the upstanding arm of the fitting.

In testimony whereof we affix our signatures.

FRANK I. COSTA.
ENOS V. MELLO.